Jan. 3, 1956      D. D. KLOSS      2,729,186
CONTROL MECHANISM FOR OUTBOARD MARINE MOTORS
Filed July 3, 1953      7 Sheets-Sheet 1

INVENTOR.
Dale D. Kloss
BY
Merchant & Merchant
ATTORNEYS

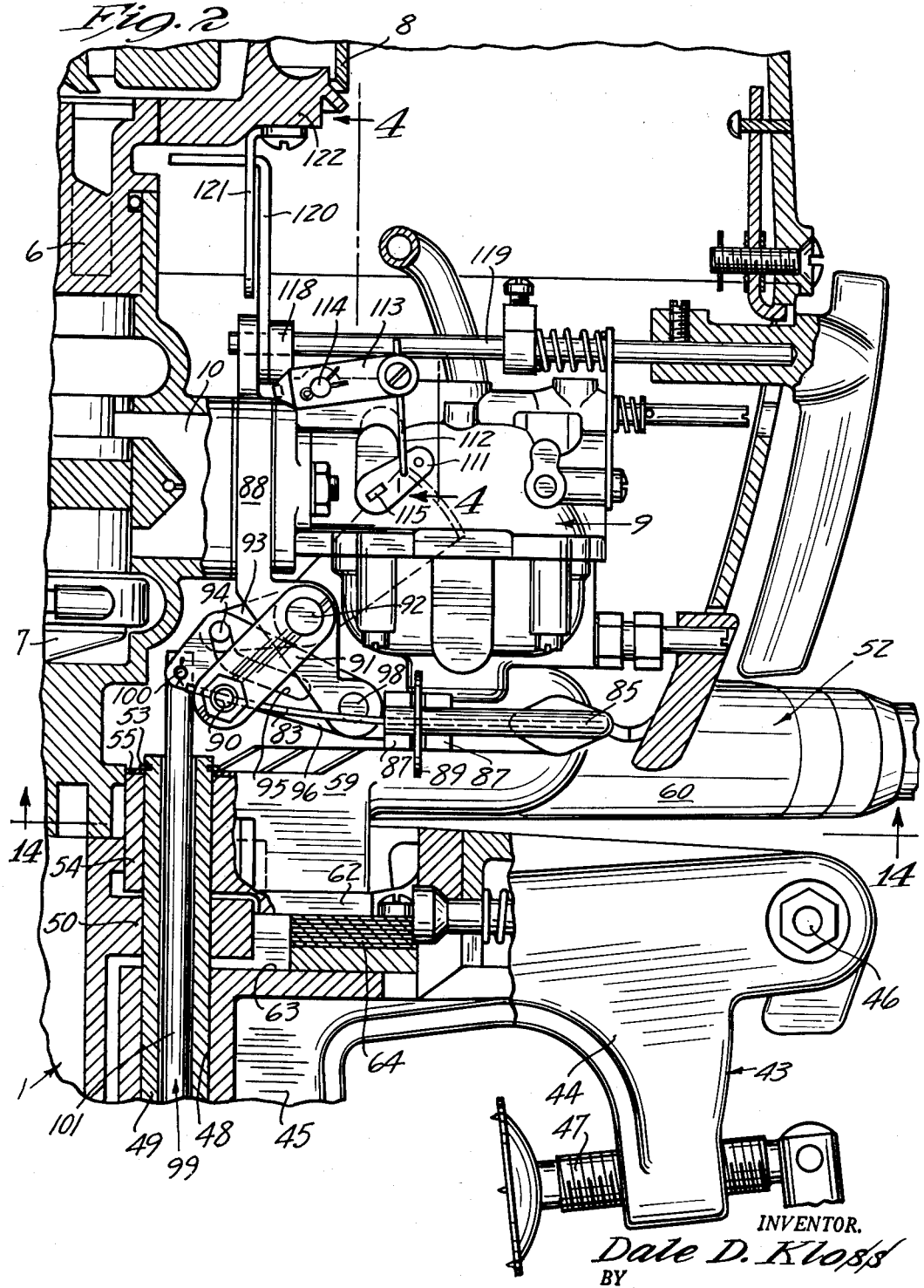

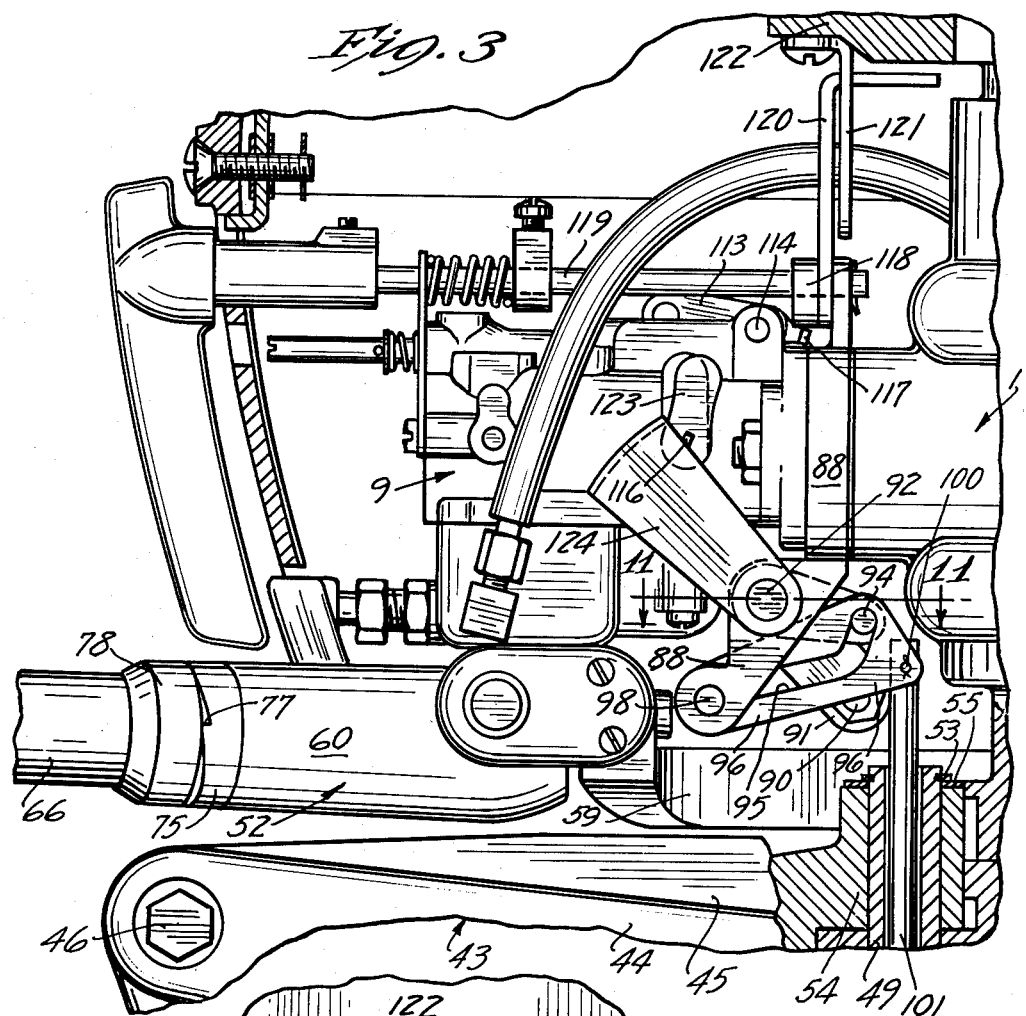
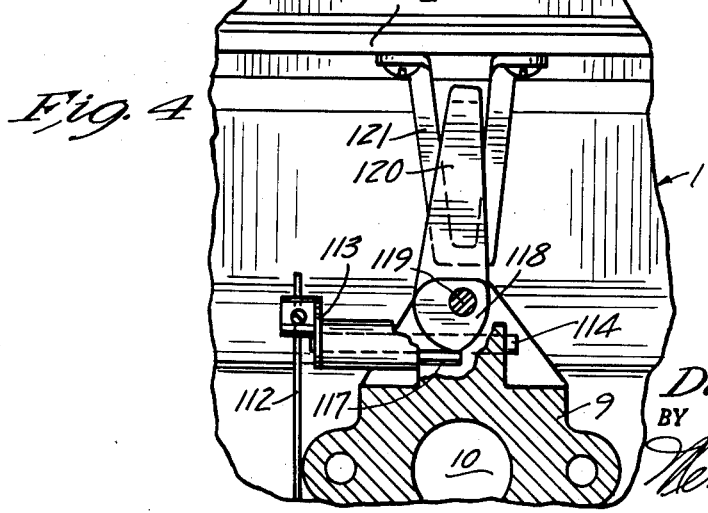

Jan. 3, 1956   D. D. KLOSS   2,729,186
CONTROL MECHANISM FOR OUTBOARD MARINE MOTORS
Filed July 3, 1953   7 Sheets-Sheet 4
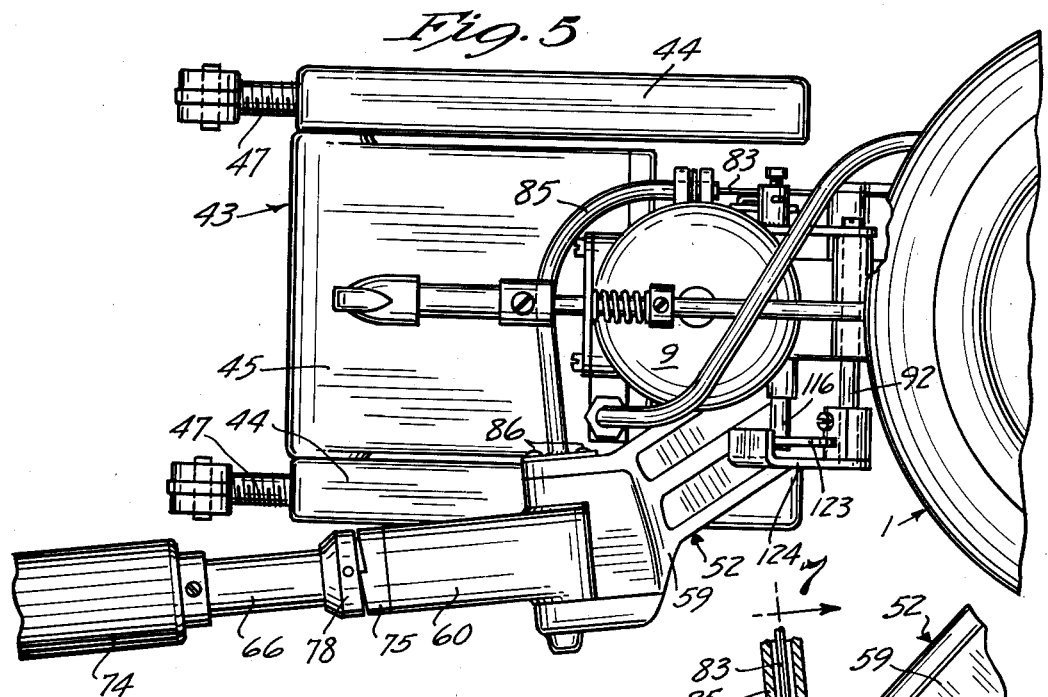
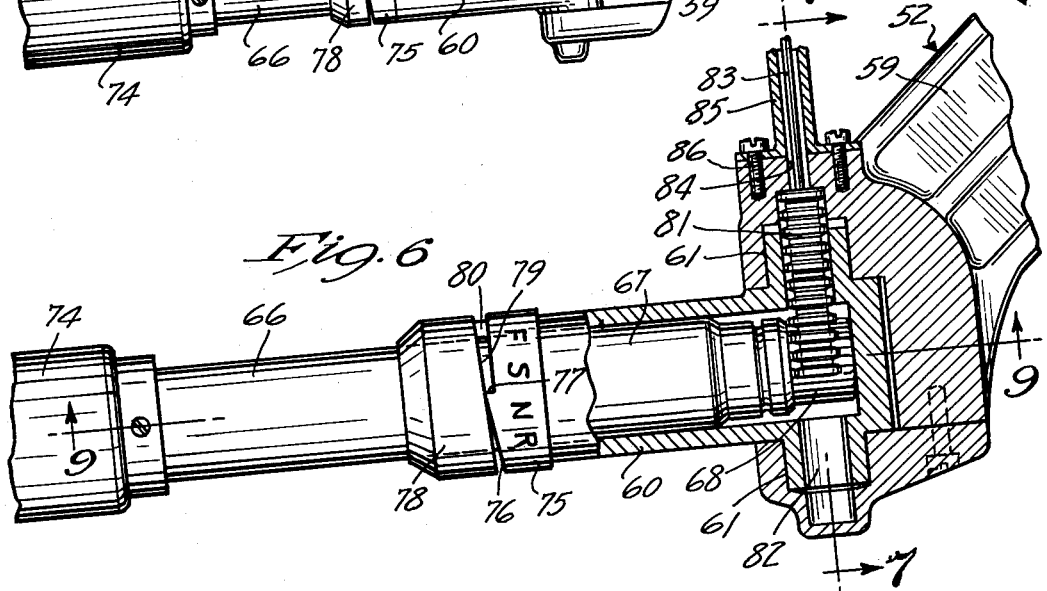
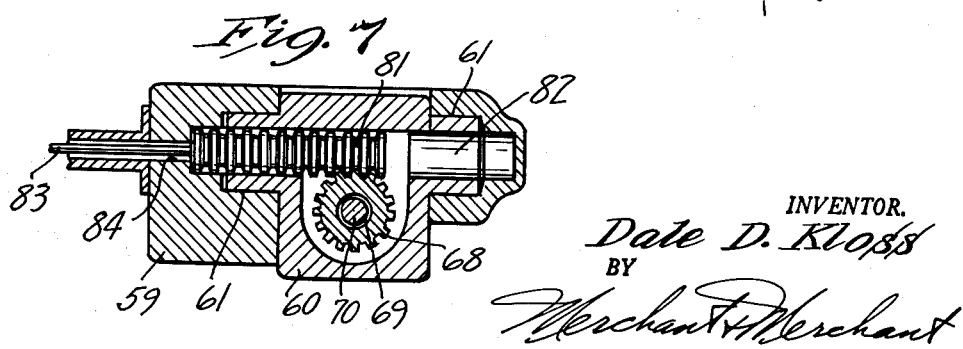
INVENTOR.
Dale D. Kloss
BY
Merchant & Merchant
ATTORNEYS

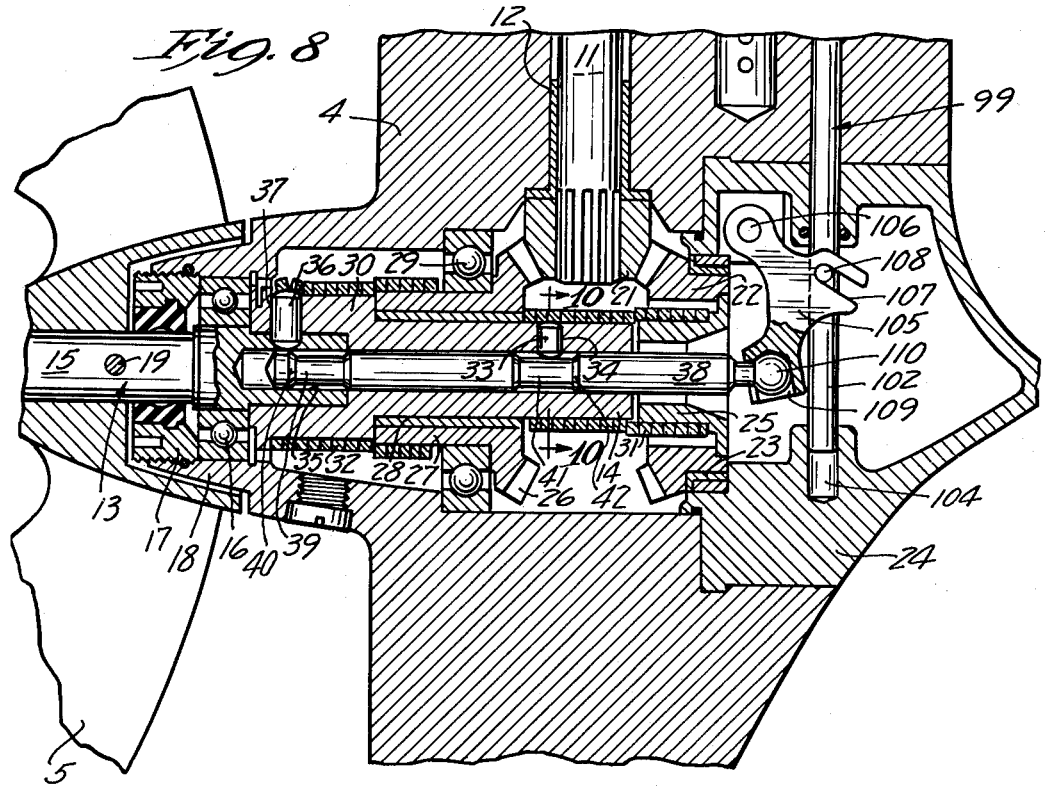
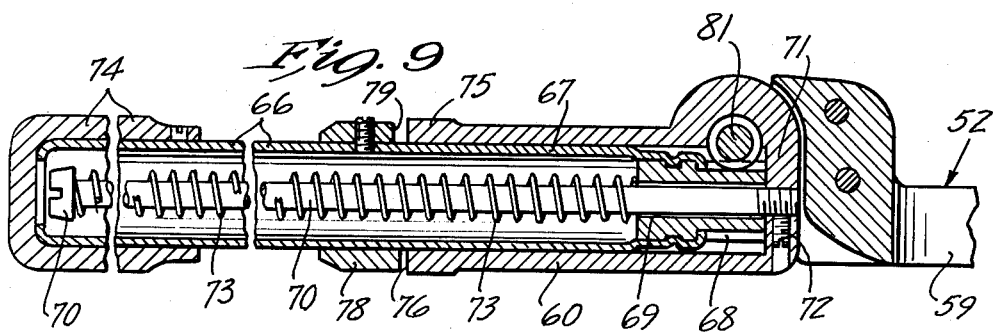
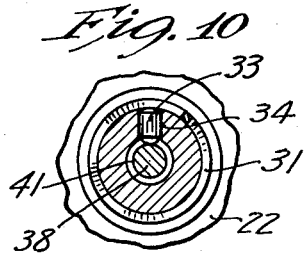

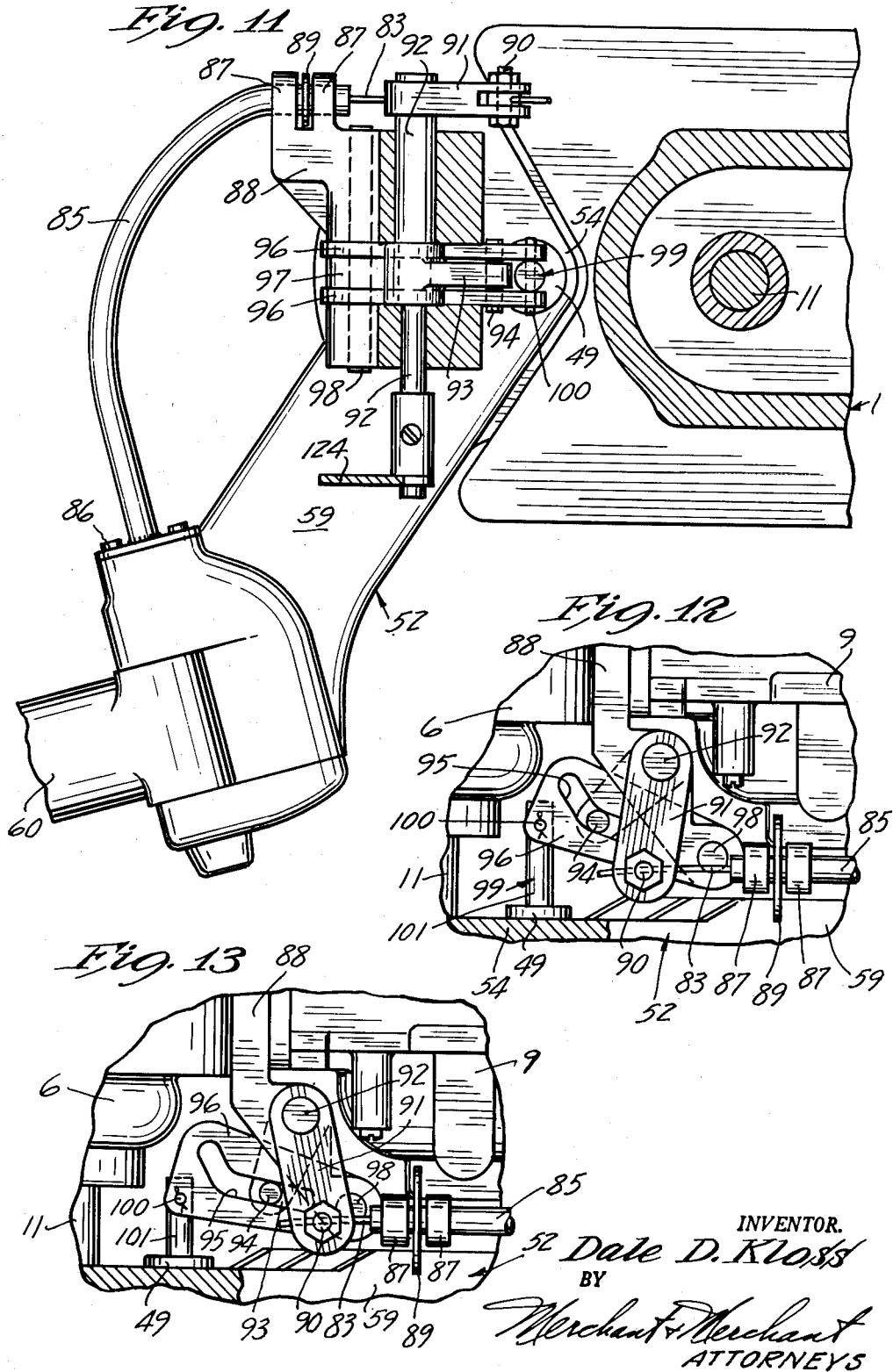

Jan. 3, 1956   D. D. KLOSS   2,729,186
CONTROL MECHANISM FOR OUTBOARD MARINE MOTORS
Filed July 3, 1953   7 Sheets-Sheet 7
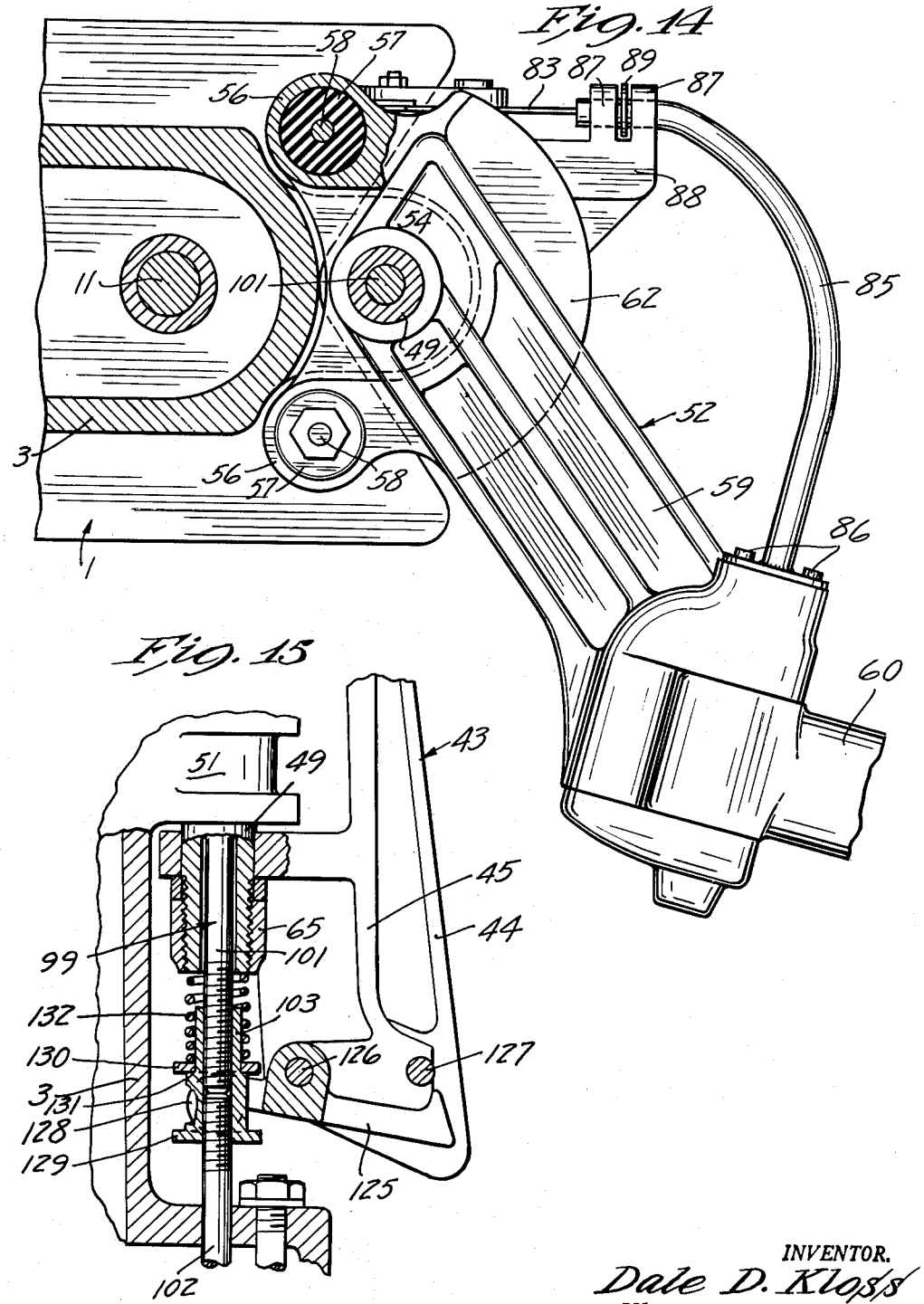
INVENTOR.
Dale D. Kloss
BY
Merchant & Merchant
ATTORNEYS

United States Patent Office 2,729,186
Patented Jan. 3, 1956

2,729,186
CONTROL MECHANISM FOR OUTBOARD MARINE MOTORS

Dale D. Kloss, Minneapolis, Minn., assignor to Champion Motors Co., Minneapolis, Minn., a corporation of Minnesota Application July 3, 1953, Serial No. 365,914

8 Claims. (Cl. 115—18)

My invention relates generally to improvements in outboard marine engines and, more specifically, to novel control mechanism for outboard motors and the like.

More particularly, my present invention is in the nature of novel means for outboard motor power transmission mechanisms in which the propeller of the motor may be placed in neutral, forward or reverse drive conditions. Heretofore, mechanism in motors of the gear shift type or the like for operatively connecting or disconnecting the propeller to the drive shaft, has usually included a shift lever or similar device movably mounted on the power head of the motor. With this arrangement, when it is desired to shift from a drive condition to a neutral condition, the operator has found it necessary to grope blindly for the shifting device or look away from the direction of movement of the boat to find the same, thus creating a possible hazard, particularly when navigating in crowded waters or in limited space. The primary object of my invention is, therefore, the provision of an outboard motor having a shift control element providing a tiller handle for the motor, whereby direction of travel, speed of the motor, and forward, neutral and reverse drive conditions, are all subject to instant control of the operator.

Another object of my invention is the provision of simple and efficient linkage between the control element on the tiller and the power transmission mechanism, whereby shifting can be quickly accomplished with a minimum of effort.

Another object of my invention is the provision of novel control mechanism whereby the motor is automatically regulated to a predetermined speed when changing of drive conditions in the transmission mechanism is made.

Another object of my invention is the provision of novel means for automatically compensating for vibration of the motor, whereby the desired set speed or drive condition is maintained regardless of such vibration.

Another object of my invention is the provision of novel control mechanism as set forth which will permit the tiller handle forming control element to be swung into a folded position for transportation and storage without affecting the setting of the motor speed or the transmission mechanism.

Still another object of my invention is the provision of novel means for automatically locking the motor against forward tilting movements when the transmission mechanism thereof is shifted to a reverse drive condition.

Still another object of my invention is the provision of control mechanism as set forth which is highly efficient in operation and which is rugged in construction and durable in use.

The above, and other highly important objects and advantages of my invention will become apparent from the following detailed specification, appended claims and attached drawings.

Referring to the drawings, which illustrate the invention, and in which like characters indicate like parts throughout the several views:

Fig. 2 is an enlarged fragmentary view of a portion of Fig. 1, some parts being broken away and some parts being shown in section;

Fig. 3 is a fragmentary view partly in side elevation and partly in section as seen from the opposite side of the motor with respect to Fig. 2;

Fig. 4 is a fragmentary view partly in front elevation and partly in section, taken substantially on the line 4—4 of Fig. 2;

Fig. 5 is an enlarged fragmentary view in plan of the front portion of the power head of the motor of Fig. 1, with some parts removed;

Fig. 6 is a still further enlarged fragmentary view in plan of the tiller handle portion of Fig. 5, some parts being broken away and some parts being shown in section;

Fig. 7 is a fragmentary detail in section taken substantially on the line 7—7 of Fig. 6;

Fig. 8 is an enlarged fragmentary vertical section of the propeller housing and power transmission mechanism of the motor of Fig. 1;

Fig. 9 is a fragmentary axial section taken substantially on the line 9—9 of Fig. 6;

Fig. 10 is a transverse section taken substantially on the line 10—10 of Fig. 8;

Fig. 11 is a view partly in plan and partly in horizontal section taken on the line 11—11 of Fig. 3;

Fig. 12 is a fragmentary view corresponding to a portion of Fig. 2 but showing a different position of some of the parts;

Fig. 13 is a view corresponding to Fig. 12 but showing a still different position of some of the parts;

Fig. 14 is a view partly in horizontal section and partly in bottom plan, taken substantially on the line 14—14 of Fig. 2; and Fig. 15 is an enlarged fragmentary view corresponding to a portion of Fig. 1 showing a novel latching arrangement, some parts being broken away and some parts being shown in section.

Figure 1:
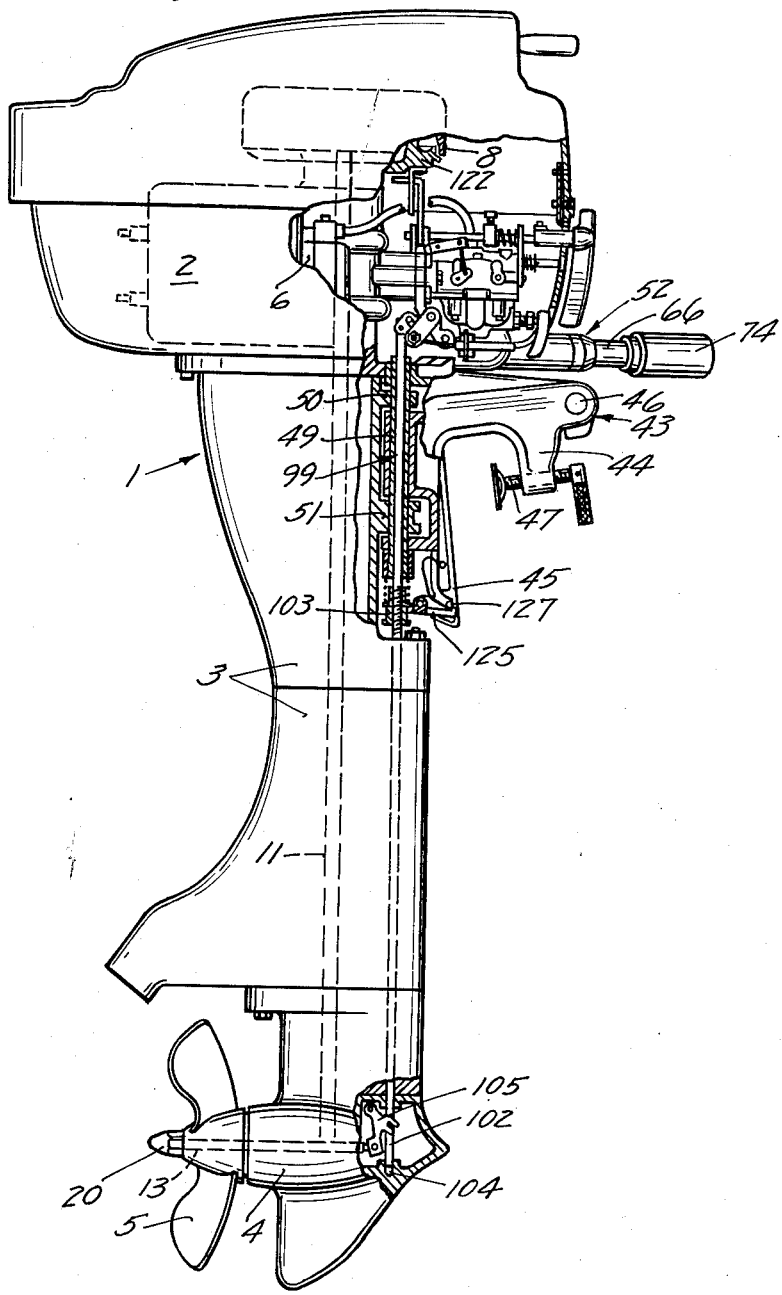
Fig. 1 is a view in side elevation of an outboard motor incorporating my novel control means, some parts being broken away and some parts being shown in section.

In the preferred embodiment of the invention illustrated, the numeral 1 indicates in its entirety an outboard motor comprising a power head 2, a drive shaft housing 3, a power transmission and propeller shaft housing 4 and a propeller 5. The power head includes an internal combustion engine 6 having a crank shaft 7, to the upper end of which is mounted a flywheel 8. A carburetor 9 of conventional design is secured over the inlet passage 10 of the engine and is provided with suitable controls hereinafter to be generally described.

The lower end of the crank shaft 7 is connected in the usual manner to a drive shaft 11 which extends vertically downwardly through the drive shaft housing 3 and which, as shown in Fig. 8, has its lower end portion journaled in a bearing 12 in the propeller shaft housing 4.

The control mechanism of the instant invention is adapted for use with transmission mechanisms having various drive conditions such as, for instance, neutral and forward; neutral, forward and reverse; neutral and two speeds forward, etcetera. In the preferred arrangement illustrated in Fig. 8, a transmission mechanism is shown as having, selectively, neutral, forward and reverse drive conditions. A propeller shaft 13 is shown as comprising front and rear shaft sections 14 and 15, respectively, the latter of which is mounted in an anti-friction bearing 16 anchored in place by a packing gland equipped retaining nut 17 screw threaded into a rear end portion 18 of the propeller shaft housing 4. The shaft sections 14 and 15 are preferably secured together for common rotation by conventional key or spline means, not shown. The propeller 5 is mounted on the rear shaft section 15 and is held against rotation by a conventional shear pin 19 and against axial movement on the shaft section 15 by the usual retaining nut 20, see Figs. 1 and 8.

A bevel gear is splined or otherwise rigidly secured to the lower end of the drive shaft 11 and has meshing engagement with a cooperating bevel gear 22 that is journaled in a sleeve bearing 23 mounted in a removable propeller shaft housing section 24 that is anchored to the shaft housing 4 by suitable means, not shown. The gear 22 is provided with an axially rearwardly extended hub element, the rear end of which terminates adjacent the front end of the propeller shaft section 14 in axial alignment therewith. As shown, the hub portion or element has an external diameter slightly greater than the diameter of the shaft section 11 for a purpose which will hereinafter be described. A second bevel gear 26 having meshing engagement with the driving gear 21 is provided with an elongated hub 27 that is journaled, by means of a sleeve bearing or the like 28, to the intermediate portion of the shaft section 14. An anti-friction bearing 29 embraces the hub portion 27 and supports the gear 26 and the shaft section 11 in the propeller shaft housing 4. Immediately rearwardly of the hub portion 27, the shaft section 14 is provided with a diametrically enlarged head or the like 30, the outer diameter of which is slightly less than the outer diameter of the hub portion 27. With reference to Fig. 8, it will be noted that the driven gears 22 and 26 are in axially aligned opposed relationship whereby to be driven simultaneously in opposite directions by the drive gear 21. Also it will be noted that said gears 22 and 26 are normally free to rotate independently of the propeller shaft 13.

A helically wound clutch-acting spring 31 encompasses the propeller shaft section 14 at its front end portion and the axially projecting hub portion of the bevel gear 22. The spring 31 is of a size relative to the hub portion 25 so as to be frictionally anchored thereon. However, the convolutions of the spring 31 encompass the underlying surface portion of shaft section 14 sufficiently loosely to normally permit free rotation of the shaft section 14 with respect thereto. As illustrated in Fig. 8 and as above stated, the hub portion 25 is of greater diameter than the spring encompassed portion of shaft section 14 so that the convolutions of the spring 31 which encompass the hub portion 25 are diametrically expanded with respect to those which encompass the shaft section 14. By this means, frictional anchoring of the spring 31 on the hub portion 25 is attained. Obviously, any suitable means for anchoring the spring 31 to the hub portion 25 may be utilized, if desired. A second helically wound clutch acting spring 32 encompasses the rearwardly extended hub portion 27 of the bevel gear 26 and the diametrically enlarged head 30 of the shaft section 14. The spring 32 is of a size relative to the diameter of the head 30 so as to normally permit free rotation of the shaft section 14 with respect thereto. The relative sizes of the hub portion 27 and the spring 32 are such that the convolutions of the spring 32 which encompass the hub portion 27 are diametrically expanded relative to those convolutions which encompass the head 30 of the shaft section 14. Thus, the spring 32 is frictionally anchored on the hub section 27 in the same manner as is the spring 31 on the hub portion 25.

For the purpose of radially contracting sufficient of the convolutions of the spring 31 overlying the cylindrical outer surface of the shaft section 14 to cause driving engagement therebetween, I provide a movable member in the nature of a pin or the like 33 which is movable in a passage 34 which extends radially inwardly from the outer cylindrical surface of the shaft section 14 and communicates at its inner end with an axially extended passage 35 in the shaft sections 14 and 15. The radially outer end of the pin 33 is preferably rounded and engages a portion of one or more convolutions of the spring 31 upon radially outward movement, and moves said portion or portions radially outwardly from the underlying surface portion of the shaft section 14. This movement causes the remaining portions of said convolution or convolutions and adjacent convolutions to contract radially against and grip the underlying outer cylindrical surface of the shaft section 14 whereby to impart rotary movement thereto in the same direction as that of the bevel gear 22. The direction of rotation of the gear 22 is such that when the convolutions of the spring 31 are contracted radially as above described, said convolutions will tend to wrap themselves tightly around the shaft section 14 and exert sufficient friction thereagainst to effect substantially a positive drive. A second pin 36 is axially movable in a passage 37 which extends radially inwardly from the outer surface of the head 30 and communicates at its inner end with the axial passage 35 in the shaft section 15. The pin 37 is similar to the pin 33 and has its rounded outer end engageable with a portion of one or more convolutions of the spring 32 upon radially outer movement to cause contraction of the convolutions of the spring 32 whereby to effect substantially a positive drive between the bevel gear 26 and the shaft 13.

Means for selectively moving the pins 33 and 36 in radially outward directions to effect driving engagement between their respective gears 22 and 26 and the shaft 13 comprises a shiftable selector element or rod 38 axially slidable in the passage 35 in the shaft sections 14 and 15. The rod 38 adjacent its rear end is diametrically reduced as indicated at 39 to provide a cam-acting surface 40 engageable with the inner end of the pin 36, upon axial movement in one direction to move the pin 36 in a radially outward direction to tighten the spring 32 and effect driving engagement between the bevel gear 26 and the shaft 13. At its intermediate portion, the rod 38 is formed to provide a diametrically reduced portion 41 and an adjacent cam-acting surface 42 which engages the inner end of the pin 34 to move the same radially outwardly into tightening engagement with the spring 31. The relative distance between the pins 33 and 36 and the diametrically reduced portions 39 and 41 and their respective cam-acting portions 40 and 42 is such that when the selector rod 38 is in its position of Fig. 8, the pin 33 is moved radially outwardly into operative engagement with its respective spring 32. A relatively short axially rearward movement of the selector rod 38 will permit the pin 36 to move radially inwardly to engage the diametrically reduced portion 39 and render the clutch spring 32 inoperative. At this point, the pin 33 is also in engagement with the diametrically reduced portion 41 whereby its cooperating clutch spring 31 is also disengaged from driving engagement with the shaft 13. This position of the selector rod 38 is a "neutral position" wherein the propeller 5 remains stationary while the drive shaft 11 rotates. Further rearward movement of the selector rod 38 will bring the cam-acting surface 42 into engagement with the pin 33 to move the same outwardly into convolution contracting engagement with the spring 31 to cause the shaft 13 to rotate in a direction opposite to that in which it rotates when the spring 32 is contracted. The above described transmission mechanism and selector element is but one of several forms which may be used to provide various drive conditions to the propeller, and is shown and described only for the purpose of illustration of the use of the invention.

The outboard motor 1 is adapted to be anchored to the transom of a conventional boat, not shown, by bracket means 43 comprising a pair of cooperating bracket elements 44 and 45 that are secured together by a pivot bolt or the like 46 for pivotal movements with respect to each other about a horizontal axis. The bracket element 44 is provided with a pair of clamping screws 47 for anchoring said element 44 to said transom. The bracket element 45 is provided with a vertical bore 48 through which extends a tubular steering spindle 49. As shown best in Figs. 1 and 2, the motor 1 is provided with a pair of upper and lower bearing lugs 50 and 51, respectively, which have aligned apertures through which the spindle 49 extends, whereby the motor 1 is mounted on the bracket element 45 for pivotal steering movements about a normally vertical axis. The extreme upper end of the spindle 49 extends through the inner end of a tiller indicated in its entirety at 52 and is held against axial movement in a downward direction by a split washer or snap ring 53 between which and the inner end 54 of the tiller is interposed a washer 55. The inner end portion 54 of the tiller 52 is formed to provide a pair of spaced bosses 56 which are bored to receive rubber-like cushioning grommets 57 through which extend nut-equipped bolts 58 which secure the inner end of the tiller to the motor 1 immediately below the power head 2 thereof. It should be here noted that the tiller 52 comprises inner and outer tiller sections 59 and 60, respectively, said inner end portion 54 forming a portion of the inner section 59. It will also be seen, with reference to Figs. 5, 6, and 7, that the inner end of the tiller section 60 is mounted in the adjacent end of the section 59 for swinging movements about a horizontal axis and as indicated at 61. The inner tiller section is further provided with a circumferentially extending flange 62 between which and the top surface 63 of the bracket element 45 is interposed a friction plate or the like 64. The lower end portion of the steering spindle 49 is threaded to receive a clamping nut 65 which may be adjusted to vary the frictional engagement between the flange 62 and the friction plate 64, whereby to vary the amount of effort required to be exerted upon the tiller to impart steering movements to the motor. When the nut 65 is tightened to a predetermined extent, the motor is frictionally held by the friction plate 64 on a predetermined course so that the operator is relieved of continuous steering effort, the rubber-like grommets 57 prevent vibrations of the motor from being transmitted to the tiller 52 but do not interfere with the proper steering movement thereof.

My novel control means for the shiftable selector rod 48 of the power transmission mechanism comprises a shiftable control element and suitable linkage therebetween and the selector rod 38 now to be described. With reference to Figs. 6 and 9, it will be seen that the outer tiller section is hollow and telescopically receives the inner end portion of a tubular handle-forming control element 66, the inner end portion 67 of which is mounted in the tiller section 60 for rotary and longitudinal sliding movements on an axis extending transversely of the axis of pivotal movement between the tiller sections 59 and 60. A toothed pinion 68 is rigidly secured to the extreme inner end of the control element 66 for common movements therewith and is provided with an axial bore 69, see Figs. 6, 7 and 9. A headed screw 70 extends axially through the control element 66 and the bore 69 in the pinion 68, and is screw threaded into the rear end wall 71 of the tiller section 60, where it is preferably locked in place by a set screw or the like 72. Interposed between the forward end of the pinion 68 and the head of the screw 70 is a coil compression spring 73 that yieldingly urges the control element 66 in an axial direction rearwardly with respect to the tiller section 60 and into abutting engagement with the rear wall 71 thereof. Preferably and as shown, a hand grip 74 made from rubber or other suitable material is rigidly secured to the forward end of the tubular control element 66. The forward end of the tiller section 60 is provided with a diametrically enlarged head or the like 75 the outer or forward end of which defines a generally helical surface 76 providing an abutment 77. Rigidly mounted on the control element 66 for engagement with the head 75 is a collar 78 the inner end of which defines a generally helical surface 79 engageable with the surface 76 of the head 75, and providing an abutment portion 80 which is adapted to be moved into abutting engagement with the abutment 77 upon rotary movement of the control element 66 in one direction for a purpose which will hereinafter be described.

As shown particularly in Figs. 7 and 9, the pinion 68 is laterally offset from the axis of the pivotal connection 61 between the tiller sections 59 and 60, and is adapted to have meshing engagement with a cross sectionally circular rack 81 which is disposed in coaxial relationship with the axis of the pivotal connection 61. As shown in Figs. 6 and 7, the rack 81 is axially movable in an elongated central recess 82 in the adjacent ends of the tiller sections 59 and 60. With reference to Fig. 9 it will be seen that the rack 81 is circular in cross section whereby to permit pivotal swinging movements between the tiller sections 59 and 60 without itself partaking of rotary movement. The cross sectionally circular shape of the rack 81 permits the same to be in meshing engagement with the pinion 68 in all positions of swinging movement of the tiller section 60 and handle-forming control member 66 about the axis of the pivotal connection 61. A flexible shaft 83 is anchored at one end to one end of the rack 81 and extends laterally outwardly through a reduced axial opening 84 in the forward end of the tiller section 59, and is guided for reciprocatory movement in a tubular guide element 85 rigidly secured to the side of the tiller section 59 over the opening 84 therein by machine screws or the like 86. The free end of the tubular guide 85 extends through suitable apertures in a pair of spaced lugs 87 that are integrally formed with a bracket 88 that is mounted between the carburetor 9 and the air intake portion 10 of the engine 6. Intermediate the lugs 87, the tubular guide 85 is provided with a circumferentially extended flange 89 which engages the lugs 87 to limit axial movement of the tubular guide 85 therein. Such limited movement between the tubular guide 85 and the lugs 87 effectively prevents vibrations of the engine from being transferred to the tiller 52, and also prevents the guide 85 from being accidentally displaced from its position in the lugs 87.

The reciprocatory flexible shaft or rod 83 projects beyond the lug supported end of the tubular guide 85 and is rigidly secured by a nut-equipped clamping screw or the like 90 to one end of a crank arm 91 the other end of which is rigidly secured to one end of a rock shaft 92 journalled in the bracket 88, see particularly Figs. 2 and 11 to 13 inclusive. The bracket 88 is bifurcated to receive a second crank arm 93 that is suitably anchored on the rock shaft 92 for common oscillatory movement therewith, and at its outer end is provided with a cam-engaging element in the nature of a pin 94 which projects laterally outwardly of the opposite sides thereof. The opposite end portions of the pin 94 are received one each in a cam slot 95 of each of a pair of spaced identical cams 96 that are rigidly connected at one end by a bushing or the like 97. A pivot pin 98 extends through the cams 96, the bushing 97 and the lower end portion of the bracket 88 whereby to journal the cams for common swinging movements in generally upward and downward directions. The free ends of the cams 96 overlie the upper end of the tubular steering spindle 49 and are pivotally connected to the upper end of a rigid link 99 by a pin or shaft 100. The rigid link 99 comprises a pair of link sections 101 and 102 the former of which is connected to the cams 96 by the pivot pin 100, and which terminates below the lower end of the spindle 49 where it is screw threaded into the upper end of a coupling 103; and the latter of which extends downwardly through the drive shaft housing 3, terminating in a recess 104 in the displaceable propeller shaft housing section 24. With reference to Fig. 15 it will be seen that the upper end of the link section 102 is screw threaded into the lower end of the coupling 103 in axial alignment with the upper link section 101.

A bell crank lever 105 is pivotally mounted in the propeller shaft housing section 24 as indicated at 106 and is provided with a slot 107 that contains a pin 108 extending transversely through and anchored in the lower end portion of the rigid link section 102. The bell crank 105 is provided with a recess 109 which receives a ball-like head 110 formed on the forwardly projecting end of the selector rod element 38. With this arrangement, vertical movements of the link 99 will impart forward and rearward shifting movements to the selector rod 38 whereby to place the transmission mechanism into neutral, forward or reverse drive conditions.

With reference particularly to Figs. 2, 3, 12 and 13, it will be seen that the shape of the cam slot 95 permits independent swinging movement of the crank arms 91 and 93 within a predetermined range of movement without imparting similar movement to the cam 96. This independent movement permits the speed of the engine to be varied by rotary movement of the control element 66 during forward travel of the motor and the boat propelled thereby through the use of mechanism now to be described. The carburetor 9 is provided with a throttle valve, not shown, but which may be assumed to be connected to a crank 111 to which is connected a thrust rod 112 that is pivotally secured to the outer end of a second crank 113 pivotally secured to the carburetor 9 as indicated at 114, see Fig. 2. The throttle valve may be assumed to be mounted on a shaft extending transversely through the carburetor and terminating at its opposite ends in cross sectionally rectangular portions 115 and 116 respectively, said crank 111 being rigidly secured to the former. The second crank 113 is provided with an offset lug 117 by means of which movement is imparted to the crank 113 and to the throttle valve from a cam 118 rigidly secured to a control shaft 119 suitably journalled in the power head. A lever 120 is also rigidly secured to the shaft 119 and engages a generally U-shaped member 121 anchored to a shaft portion 122 of the magneto of the engine 6. The magneto is of the type commonly used in outboard motors and in itself does not comprise the instant invention. Hence, for the sake of brevity the same is neither shown nor described in detail. It should suffice to state that movement of the shaft 119 in a counterclockwise direction with respect to Fig. 4 causes the spark to be advanced and the throttle to be opened whereby to increase the driving speed of the engine. Obviously rotation of the shaft 119 in the opposite direction will cause the throttle to be closed and the spark to be retarded whereby to reduce the speed of the engine. Means for connecting the control element 66 to the throttle whereby the same may be operated by the control handle 66 comprises a crank-acting lever 123 secured to the end 116 of the throttle and a crank member 124 having its inner end anchored to the rock shaft 92 and its inturned outer end swingable into and out of engagement with the crank acting lever 123.

The cam slots 95 in the cams or rock arms 96 are so shaped, that, during a portion of rotary movement of the control element 66, the cam engaging pin 94 is movable independently with respect to the cam or rock arm 96. During this independent movement, the crank member 124 engages the arm 123 to increase or decrease the speed of the engine 9 between its normal idling speed and its maximum speed. The arrangement is such that this independent movement takes place only when the transmission mechanism is in its forward drive condition. Rotary movement of the control element 66 in a clockwise direction with respect to Fig. 7 causes the gear rack 81 to retract the flexible shaft 83 thereby swinging the crank arms 91 and 93 in a forward and downward direction respectively whereby to decrease the engine speed. When the control element 66 is rotated sufficiently to bring the abutment 80 thereon into engagement with the abutment 77 on the tiller section 60, the propeller will be rotating at idling speed in a forward drive direction. At this point the cam engaging pin 94 will be positioned in the cam slots 95 as indicated in Fig. 12. When it is desired to shift into a neutral drive condition, it is merely necessary for the operator to move the control element 66 axially outwardly against bias of the spring 73 whereby to shift the abutment 80 axially out of engagement with the abutment 77 and rotate the control handle or element 66 further in a clockwise direction with respect to Fig. 7. This further rotary movement of the control element 66 is transferred by the linkage including the crank arms 91 and 93, the cam 96, rigid link 99 and the bell crank 105 to longitudinal movement of the selector rod 38 in a rearward direction sufficient to permit radially inward movement of the pin 36 and consequent disengagement of the clutch spring 32 from frictional locking contact with the propellor shaft section 14. In this position of the above-mentioned elements, the inner end of the pin 33 remains in contact with the diametrically reduced portion 41 of the selector rod, so that there is no frictional driving connection between the drive shaft 11 and the propeller shaft 13. Further rotary movement of the control element 66 in a clockwise direction with respect to Fig. 7 causes the cam engaging pin 94 to move further forwardly in the cam slot 95 whereby to further depress the rigid link 99 and cause further rearward movement to be imparted to the selector rod 38. Such movement will bring the cam-acting surface 32 of the rod 38 into engagement with the inner end of the pin 33 to move the same radially outwardly into convolution contracting engagement with its cooperating clutch-acting spring 31. With the clutch spring 31 locked in frictional engagement with the front end portion of the shaft section 14, the propellor 5 will be rotated in a reverse drive direction. With reference to Fig. 6, it will be seen that the enlarged head 75 of the tiller section 60 is marked with suitable indicia F S N and R indicating respectively fast, slow, neutral and reverse. It should be noted that, when the control element 66 is rotated to neutral and reverse driving positions, the crank member 124 is swung thereby in a direction to move the controller element 123 toward a slow engine speed position. This arrangement insures that the engine will be driven at a safe speed during reverse operation. The cooperating abutments 77 and 80 prevent accidental shifting of the motor from a slow forward speed to a neutral driving condition. Thus when the operator desires to drive the motor at its minimum forward speed for trolling or the like he merely turns the control handle to a position where the abutments 77 and 80 are in engagement, after which, if it is desired to shift into neutral or reverse, the control element 60 must be moved axially forwardly as above described. Of course, when the motor is driving in reverse or is in its neutral condition, it is merely necessary to rotate the control element 66 in a direction counterclockwise with respect to Fig. 7. The generally helical end surfaces 76 and 79 of the head 75 and collar 78 respectively permits the control handle 66 to be rotated in this direction without interruption so that shifting from neutral or reverse to forward may be accomplished in an instant.

For the purpose of automatically preventing forward tilting of the motor when the same is in its reverse drive condition, but permitting such forward swinging movement about the axis of the pivot bolt 46 when the motor is in neutral or forward drive condition, I provide automatic latch mechanism for releasably locking the bracket elements 44 and 45 together as follows:

A latch hook 125 is pivotally mounted, by means of a pin 126 to the bracket element 45, and has its hooked end 46 adapted to operatively engage a hook engaging element in the nature of a latch pin 127 extending transversely across the transom mounting bracket element 44. The bifurcated opposite end of the latch hook 125 is formed to provide a pair of head elements 128, one of which is shown. Said head elements 128 lie between a radially outwardly projecting circumferentially extended flange 129 in the lower end of the coupling 103 and a washer 130 axially slidably movable on the coupling 103 between its upper end and an annular shoulder 131 formed thereon. A coil compression spring 132 interposed between the washer 130 and the overlying lower end of the tubular steering spindle 49 yieldingly urges the washer 130 toward engagement with the shoulder 131. When the control member 66 is turned in a direction to raise the rigid link 99 to place the transmission mechanism into a neutral or a forward drive condition, engagement of the annual flange 129 with the heads 128 causes swinging movement of the hook 125 in a direction to disengage the pin 127, thus leaving the motor free for forward tilting movements toward a generally horizontal inoperative position. However, when the control element 66 is rotated from neutral or forward drive position to a reverse drive position, consequent downward movement of the rigid link 99 will cause the washer 130 on the coupling 103 to swing the latch hook 125 into engagement of the hook element 46 thereof with the latch pin 127, whereby to prevent such forward tilting movement. In the event that such shifting from forward drive or neutral positions to a reverse drive position is made when the motor is in a forwardly tilted position, after which the motor is tilted rearwardly to its generally vertical operative position, the coil spring 132 will yield sufficiently to permit the latch hook to rock about its pivot pin 126 and snap into its latch pin engaging position of Fig. 1. With this arrangement, subsequent accidental forward tilting of the motor is effectively prevented.

My invention has been thoroughly tested and found to be completely satisfactory for the accomplishment of the objectives set forth; and, while I have shown and described a commercial embodiment of my novel structure, it will be understood that the same is capable of modification without departure from the spirit and scope of the invention as defined in the claims.

What I claim is:

1. An outboard marine motor comprising a power head, a propeller, drive means between the power head and propeller, said drive means comprising a transmission mechanism of the type which is selectively variable as to drive condition, said transmission mechanism comprising a shiftable selector element mounted for movements between neutral and drive positions, bracket means for securing the motor to the transom of a boat, means vertically pivotally mounting said outboard motor on said bracket means for pivotal steering movements, a tiller secured to said motor for imparting pivotal steering movements thereto, said tiller comprising a pair of cooperating tiller sections one of which is anchored to the motor and the other of which is pivotally secured to said one thereof for limited swinging movements about a substantially horizontal axis extending generally in the direction of steering movements, a manually operative transmission control element for said shiftable selector element, said control element providing a handle for said tiller and being telescopically received in said pivotally mounted tiller section for limited rotary movements between neutral and driving positions and about an axis extending longitudinally of said tiller and transversely of the axis of pivotal movement of said other tiller section, a pinion on the inner end of said handle, operating linkage between said pinion and said selector element of the transmission mechanism, said linkage including a cross sectionally circular gear rack extending coaxially of the pivotal connection between said tiller sections and having meshing engagement with said pinion, and stop means limiting rotary movement of said control element in one direction with respect to said pivotally mounted tiller section, said control element being axially movable with respect to said tiller, whereby to cause disengagement of the control element with said stop means and to permit further rotary movement of said control element in the same direction.

2. An outboard marine motor comprising a power head including an internal combustion engine, a carburetor for said engine, and a throttle lever on said carburetor for governing the speed of the engine; a propeller; drive means between the power head and propeller; said drive means comprising a transmission mechanism of the type which is selectively variable as to drive condition; said transmission mechanism comprising a shiftable selector element mounted for movements between neutral and drive positions; bracket means for securing the motor to the transom of a boat; means vertically pivotally mounting said outboard motor on said bracket means for pivotal steering movements; a tiller secured to said motor for imparting pivotal steering movements thereto; a manually operative transmission control element for the shiftable selector element; said control element being mounted on said tiller for shifting movements with respect thereto between neutral and drive positions and providing a tiller handle; operating linkage between the control element and said selector element of the transmission mechanism; and mechanism operatively engaging said lever and the operating linkage between said shiftable selector element and said transmission control element; selector shifting movements of said control element in one direction imparting movement to said lever in a direction to cause a predetermined reduction in the driving speed of the power head.

3. An outboard marine motor comprising a power head, a propeller, drive means between the power head and propeller, said drive means comprising a transmission mechanism of the type which is selectively variable as to drive condition, said transmission mechanism comprising a shiftable selector element mounted for movements between neutral and drive positions, bracket means for securing the motor to the transom of a boat, means vertically pivotally mounting said outboard motor on said bracket means for pivotal steering movements, a tiller secured to said motor for imparting pivotal steering movements thereto, a manually operative transmission control element for said shiftable selector element, said control element being mounted on said tiller for shifting movements with respect thereto between neutral and drive positions and providing a tiller handle, operating linkage between said control element and said selector element of the transmission mechanism, said operating linkage comprising a rigid link extending between said power head and the power transmission mechanism and coupled to the shiftable selector element, a reciprocatory member operated by said handle-forming control element, and connections between said member and link and including a cam and a cooperating cam-engaging element, one operatively associated with said member and one with said link, said cam having a contour which provides for independent movement therebetween and said member to a predetermined extent, said power head including a speed controller, and mechanism connected to said reciprocatory member and operatively engaging said controller, shifting of said control element within the range of said independent movement between said cam and cam-engaging element causing corresponding variation in driving speed of said power head.

4. The structure defined in claim 3 in which said reciprocatory member includes an elongated flexible resilient portion anchored to said connection associated therewith, and in further combination with a rigid tubular guide for said resilient portion, said guide being anchored at one end to said tiller, means mounting the opposite end portion of said guide to the power head for longitudinal movements with respect thereto, said means comprising a pair of spaced bearing lugs on said power head and through which said guide projects, and a stop collar fast on said tubular member between said lugs and engageable with either thereof upon movements of said guide in opposite directions to limit said movement of the guide.

5. An outboard marine motor comprising a power head, a propeller, drive means between the power head and propeller, said drive means comprising a transmission mechanism of the type which is selectively variable as to drive condition, said transmission mechanism comprising a shiftable selector element mounted for movements between neutral and drive positions, bracket means for securing the motor to the transom of a boat, means vertically pivotally mounting said outboard motor on said bracket means for pivotal steering movements, a tiller secured to said motor for imparting pivotal steering movements thereto, a manually operative transmission control element for said shiftable selector element, said control element being mounted on said tiller for shifting movements with respect thereto between neutral and drive positions and providing a tiller handle, operating linkage between said control element and said selector element of the transmission mechanism, said operating linkage comprising a rigid link coaxial with the steering axis of the motor and extending between the transmission mechanism and said power head, a member connected to said handle for reciprocatory movements responsive to rotary shifting movements of the handle, a rock shaft journaled in the power head, a crank arm on said rock shaft and coupled to said reciprocatory member, and a cam and cooperating cam-engaging element, one secured to said rigid link and the other to said rock shaft, said cam having a contour which provides for independent movement therebetween and said reciprocatory member to a predetermined extent, said power head including a speed controller, and mechanism connected to said rock shaft and operatively engaging said controller, shifting of said control element within the range of said independent control movement between said cam and cam-engaging element causing corresponding variation in driving speed of said power head.

6. The structure defined in claim 5 in which said cam-engaging element comprises a crank arm mounted on said rock shaft, and in which said cam comprises a rock arm pivotally secured at one end to the upper end of said rigid link and at its other end to said power head for generally upward and downward rocking movements with respect to said head.

7. An outboard marine motor comprising a power head; a propeller; drive means between the power head and the propeller, said drive means comprising a transmission mechanism shiftable between neutral, forward, and reverse propeller driving conditions, and a shiftable selector element mounted for movements between neutral, forward and reverse positions; bracket means for securing the motor to a transom of a boat; means vertically pivotally mounting said outboard motor on said bracket means for pivotal steering movements; a tiller secured to said motor for imparting pivotal steering movements thereto, said tiller comprising a pair of cooperating tiller sections, one of which is anchored to the motor and the other of which is pivotally secured to one side thereof for limited swinging movements about a substantially horizontal axis extending generally in the direction of steering movements; a manually operative transmission control element for said shiftable selector element; said control element providing a handle for said tiller and being telescopically received in said pivotally mounted tiller section for limited rotary movements between neutral, forward and reverse driving positions and about an axis extending longitudinally of said tiller and transversely of the axis of pivotal movement of said other tiller section, a pinion on the inner end of said handle, operating linkage between said pinion and said selector element of the transmission mechanism, said linkage including a cross-sectionally circular gear rack extending coaxially of the pivotal connection between said tiller sections and having meshing engagement with said pinion, and stop means limiting rotary movement of said control element in one direction with respect to said pivotally mounted tiller section, said control element being axially movable with respect to said tiller, whereby to cause disengagement of the control element with said stop means and permit further rotary movement of said control member in the same direction.

8. An outboard marine motor comprising a power head, a propeller, drive means between the power head and propeller, said drive means comprising a transmission mechanism of the type which is selectively variable as to drive condition, said transmission mechanism comprising a shiftable selector element mounted for movements between neutral and drive positions, bracket means for securing the motor to the transom of a boat, means vertically pivotally mounting said outboard motor on said bracket means for pivotal steering movements, a tiller secured to said motor for imparting pivotal steering movements thereto, a manually operative transmission control element for said shiftable selector element, said control element being mounted on the tiller for rotary movements with respect thereto between neutral and drive positions about an axis extending generally longitudinally of the tiller and for limited axial sliding movements with respect to said tiller, stop means on said tiller registrable with said control element in one position of its axial movement to limit rotary movement thereof in one direction, axial movement of said control element to another position out of register with said stop means permitting further rotary movement of said control element in said one direction, the control element providing a handle for the tiller and operating linkage between said control element and said selector element of the transmission mechanism, rotary movement of the control element beyond the stop means in said one direction causing shifting of said selector element to a neutral position.

References Cited in the file of this patent
UNITED STATES PATENTS

| | | |
|---|---|---|
| 1,181,634 | Bivert | May 2, 1916 |
| 1,683,893 | Irgens | Sept. 11, 1928 |
| 2,071,634 | Irgens | Feb. 23, 1937 |
| 2,528,480 | Wilson | Oct. 31, 1950 |
| 2,583,910 | Watkins | Jan. 29, 1952 |
| 2,635,576 | Kiekhaefer | Apr. 21, 1953 |
| 2,644,419 | Heidner | July 7, 1953 |
| 2,651,278 | Davison | Sept. 8, 1953 |